(12) United States Patent
Taggart et al.

(10) Patent No.: US 9,126,764 B1
(45) Date of Patent: Sep. 8, 2015

(54) TELESCOPING ARTICLE RETRIEVAL SYSTEM WITH PLENUM ASSEMBLY ATTACHED TO SLAVE BELT

(71) Applicants: John E. Taggart, Fort Collins, CO (US); David E. Carson, Fort Collins, CO (US)

(72) Inventors: John E. Taggart, Fort Collins, CO (US); David E. Carson, Fort Collins, CO (US)

(73) Assignee: CBW Automation, Inc., Fort Collins, CO (US)

( * ) Notice: Subject to any disclaimer, the term of this patent is extended or adjusted under 35 U.S.C. 154(b) by 353 days.

(21) Appl. No.: 13/815,973

(22) Filed: Mar. 19, 2013

(51) Int. Cl.
*B65G 41/02* (2006.01)
*B65G 25/08* (2006.01)
*B65G 47/90* (2006.01)

(52) U.S. Cl.
CPC ............... *B65G 25/08* (2013.01); *B65G 41/02* (2013.01); *B65G 47/902* (2013.01)

(58) Field of Classification Search
CPC ...... B65G 47/912; B65G 47/95; B65G 15/60; B65G 15/62; B65G 15/64; B65G 41/02; H05K 13/0408
See application file for complete search history.

(56) References Cited

U.S. PATENT DOCUMENTS

| | | | |
|---|---|---|---|
| 4,954,042 A | 9/1990 | Becicka et al. | |
| 5,234,328 A * | 8/1993 | Willson et al. | 414/222.01 |
| 5,465,854 A | 11/1995 | Sturm et al. | |
| 5,702,734 A * | 12/1997 | Hartman et al. | 425/534 |
| 6,026,970 A * | 2/2000 | Sturm et al. | 74/89.35 |
| 6,036,429 A * | 3/2000 | Johnson | 414/752.1 |
| 6,227,353 B1 * | 5/2001 | Amador et al. | 198/817 |
| 6,230,876 B1 * | 5/2001 | Gilberti et al. | 198/689.1 |
| 6,688,189 B2 | 2/2004 | Hashimoto et al. | |
| 6,941,647 B2 * | 9/2005 | Cho et al. | 414/752.1 |
| 2006/0096838 A1 * | 5/2006 | Buchko | 198/689.1 |

* cited by examiner

*Primary Examiner* — Gerald McClain
(74) *Attorney, Agent, or Firm* — William E. Hein

(57) ABSTRACT

A telescoping article retrieval system for rapidly removing articles from a plastic molding machine or other manufacturing process in a way that significantly reduces the cycle time, while consistently maintaining vacuum control of the articles being handled. Two light weight double telescoping tubes are driven by a dual carriage assembly in which power is conveyed to one carriage by means of a servo, belt drive or other mechanism, allowing it to extend and retract. A second belt drive encompasses a first carriage and ties a second carriage to a fixed main beam such that linear movement of the first carriage of the dual carriage assembly a certain distance causes linear movement of the second carriage of the dual carriage assembly and also causes linear movement of the double telescoping tubes a distance equal to twice the distance that the first carriage has moved.

4 Claims, 5 Drawing Sheets

TELESCOPING ARTICLE RETRIEVAL SYSTEM WITH PLENUM ASSEMBLY ATTACHED TO SLAVE BELT

BACKGROUND AND SUMMARY OF THE INVENTION

This invention relates generally to article retrieval systems of the type employed to rapidly remove articles from a plastic molding machine or other manufacturing process and, more particularly, to a compact double telescoping vacuum retrieval system utilizing high-flow vacuum.

Various telescoping article retrieval systems are known in the prior art. U.S. Pat. No. 6,227,352 to Johnson describes an article retrieval system utilizing two pairs of telescoping retrieval tubes. U.S. Pat. Nos. 5,465,854 and 6,026,970 to Sturm et al. describe telescoping tube assemblies. U.S. Pat. No. 6,688,189 to Hashimoto et al. describes a robot utilizing a telescopic drive mechanism. U.S. Pat. No. 4,954,042 to Becicka et al. describes a double telescoping arm adapted for use in robotic palletizers.

The representative prior art machines described above are disadvantageous in a variety of aspects. Some of them occupy undesirably large areas of floor space. They typically employ low flow-high pressure vacuum and suction cups that must physically contact each article to be handled in order to effect capture and removal of articles from a molding machine. These techniques require that the machines perform additional movements which result in longer cycle times. In addition, these prior art machines suffer from an inability to consistently maintain vacuum control of captured articles.

The present invention provides a space-saving telescoping article retrieval system for rapidly removing articles from a plastic molding machine or other manufacturing process in a way that significantly reduces the cycle time over that of prior art machines, while consistently maintaining vacuum control of the articles being handled.

In accordance with the illustrated preferred embodiment of the present invention, two light weight double telescoping tubes are driven by a dual carriage assembly in which power is conveyed to one carriage through a servo, belt drive or other mechanism, allowing it to extend and retract. A second belt drive encompasses a first carriage and ties a second carriage to a fixed main beam such that linear movement of the first carriage of the dual carriage assembly a certain distance causes linear movement of the second carriage of the dual carriage assembly and also causes linear movement of the double telescoping tubes a distance equal to twice the distance that the first carriage has moved.

DETAILED DESCRIPTION OF THE PREFERRED EMBODIMENT

Referring now generally to FIGS. 1-5, there is shown a telescoping article retrieval system 100 which can be fixedly or slidably mounted in various configurations proximate to a conventional plastic molding machine or other external machinery for further processing. Article retrieval system 100 includes a horizontal, fixedly-positioned longitudinal main beam 2, an intermediate carriage 4, and a plenum assembly 12.

Figure 3:
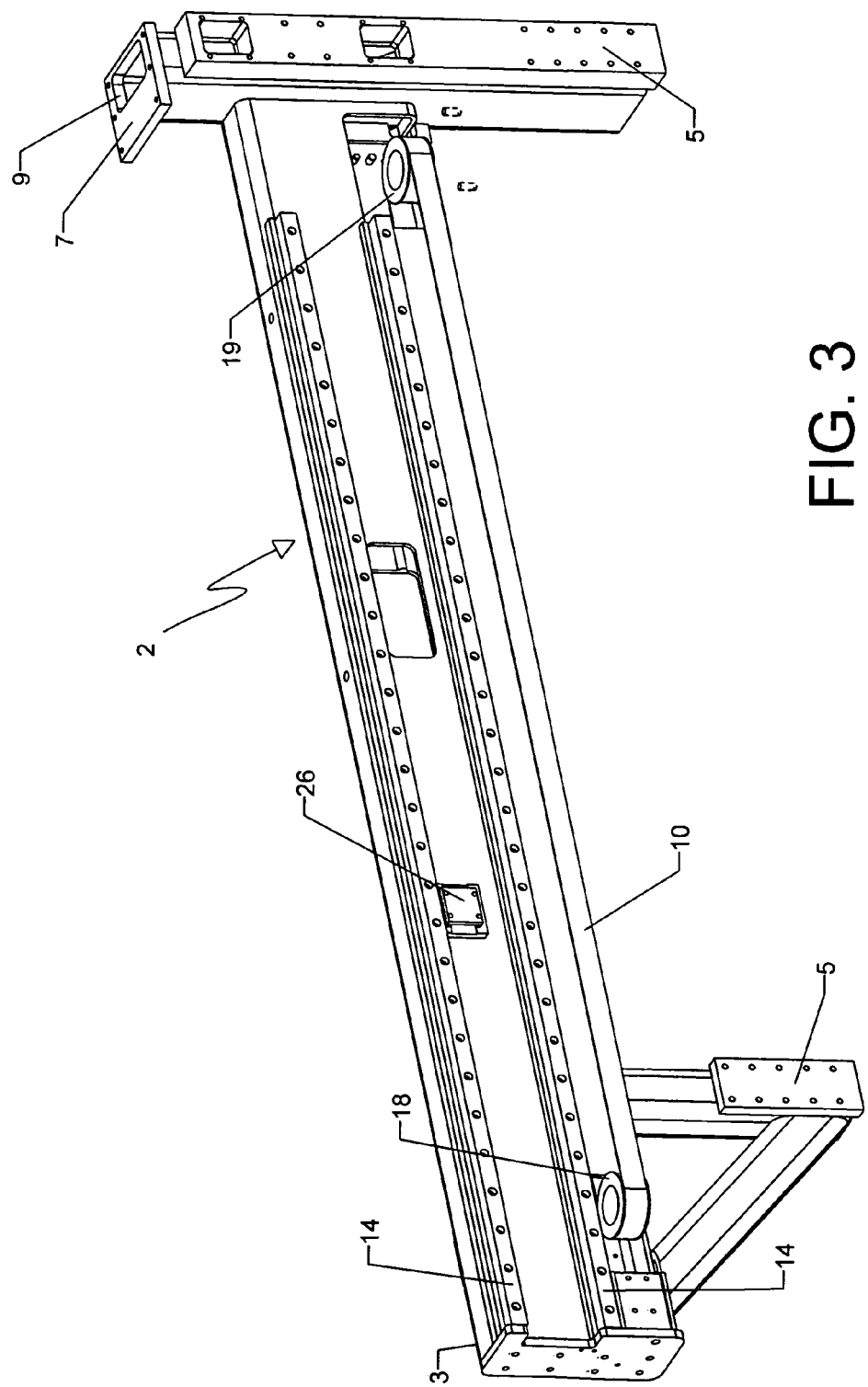
FIG. 3 is a pictorial diagram illustrating a main beam assembly portion of the article retrieval system of FIGS. 1 and 2.

Referring now more specifically to FIG. 3, there are shown the details of main beam 2 of the article retrieval system 100. Main beam 2 is primarily a structural tube 3 that includes left and right support members 5 for mounting article retrieval system 100 to an external support structure. Right support member 5 includes a vacuum interface pad 7 at a vacuum port 9 to facilitate coupling an external vacuum source, not part of the present invention, to vacuum port 9. In addition, right support member 5 provides mounting points for a pair of stationary vacuum tubes 28 to convey vacuum air to an external device. A driven pulley 19 is fixedly mounted to the outer face of structural tube 3 of main beam 2 by any conventional means such as shafting and rotational bearings. An idler pulley 18 is slidably attached to the outer face of structural tube 3 by similar conventional means. Idler pulley 18 conveys tension to a master drive belt 8 that is attached between idler pulley 18 and driven pulley 19. Two main beam rails 14 are fixedly longitudinally attached to the outer face of structural tube 3 by way of conventional fasteners. Idler pulley 18, driven pulley 19, and master drive belt 8 cooperate in concert to provide power to the intermediate carriage 3 when rotational motion is applied to driven pulley 19 by an external driver, such as a servo motor.

Figure 4:
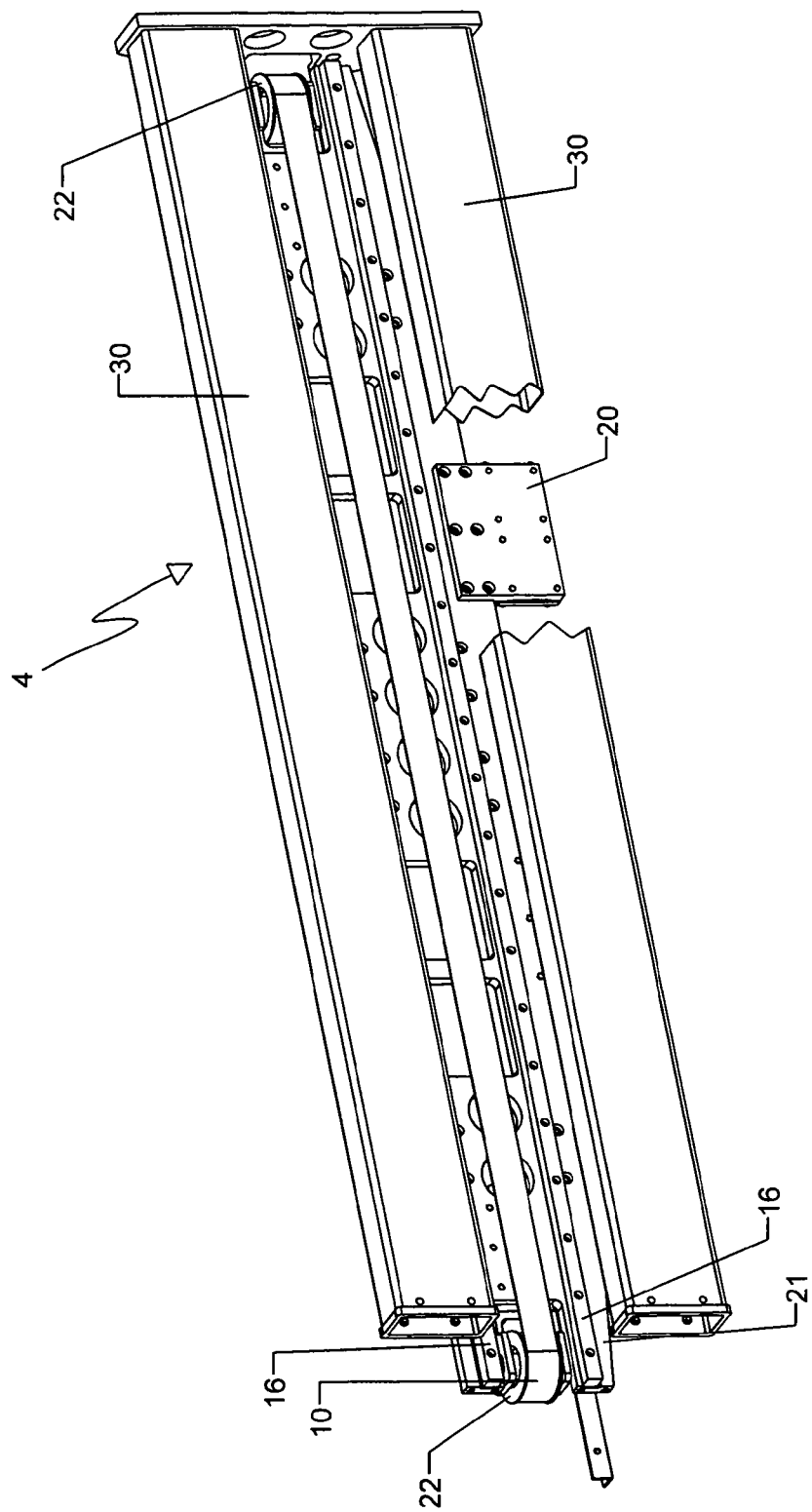
FIG. 4 is a pictorial diagram illustrating an intermediate carriage portion of the article retrieval system of FIGS. 1 and 2

Referring now more specifically to FIG. 4, it will be seen that the primary component of intermediate carriage 4 is a carriage plate 21, while two intermediate vacuum tubes 30 serve as an additional conduit for conveyance of vacuum air. A plurality of intermediate carriage bearings 23 are fixedly attached to the inner face of carriage plate 21. A master drive belt clamp 20 is fixedly attached to the outer face of carriage plate 21. Intermediate carriage bearings 23 and master drive belt clamp 20 serve to slidably attach intermediate carriage 4 to the main beam rails 14. Two intermediate carriage rails 16 are fixedly longitudinally attached to the outer face of carriage plate 21 by way of conventional fasteners. Two slave belt idler pulleys 22 are attached at opposite ends of carriage plate 21, and a slave belt 10 is tensioned over slave belt idler pulleys 22. Slave belt 10 is additionally attached to main beam 2 by way of a main beam belt clamp 26. The slave belt idler pulleys 22 and slave belt 10 work in concert to transfer power from the intermediate carriage 4 to the plenum assembly 12.

Figure 1:
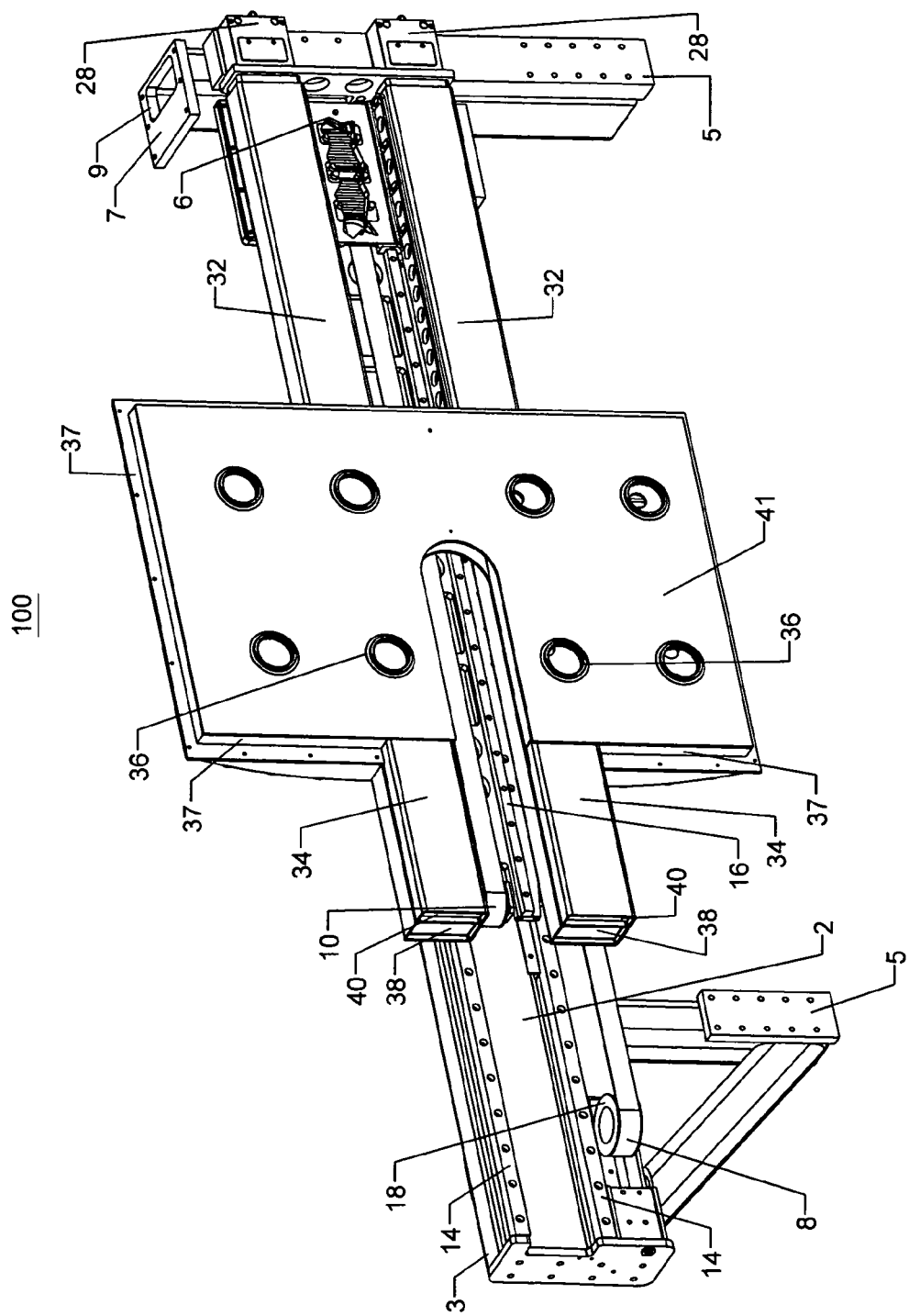
FIG. 1 is an overall pictorial diagram of the telescoping article retrieval system of the present invention.
Figure 2:
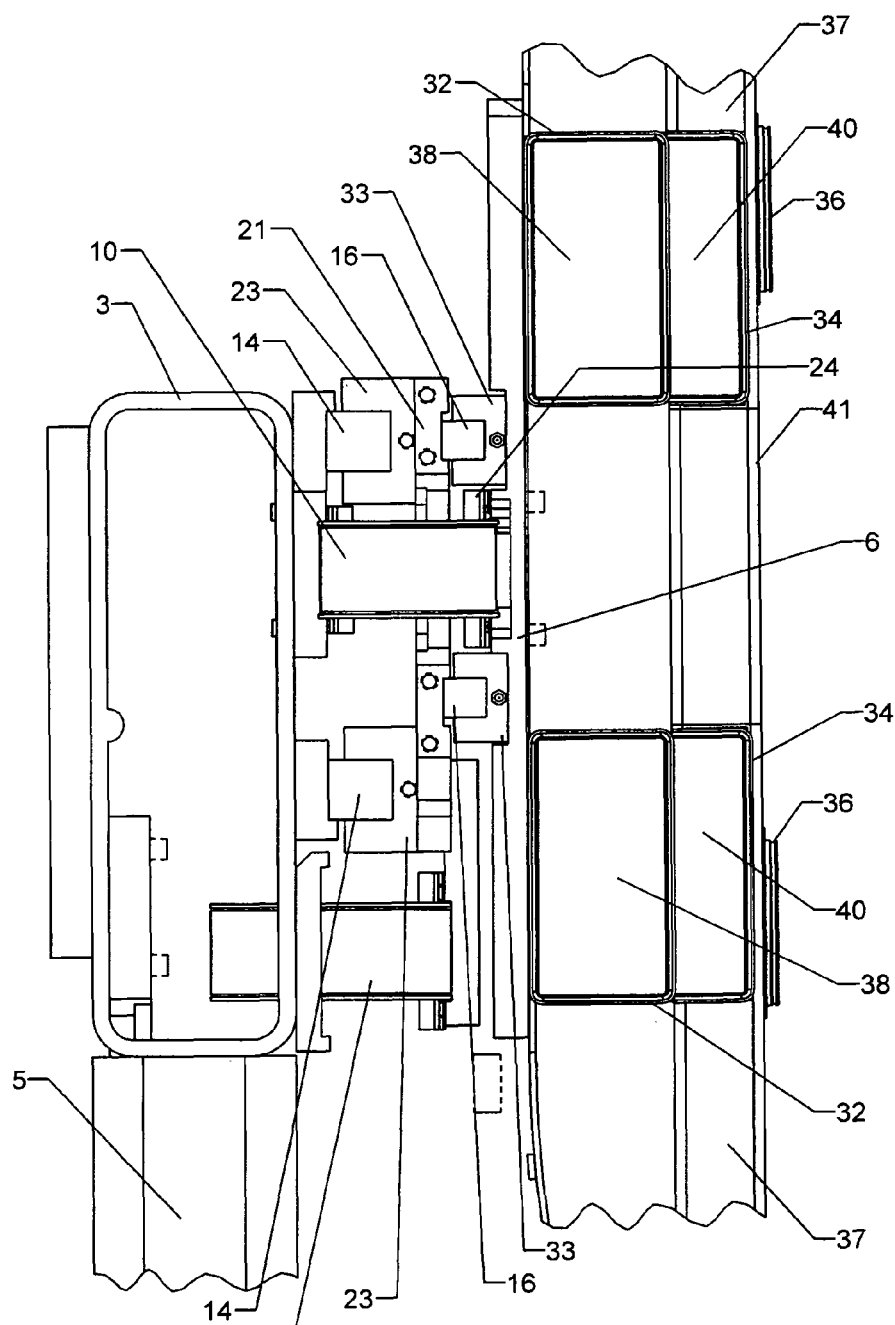
FIG. 2 is an end pictorial diagram of the article retrieval system of FIG. 1.
Figure 5:
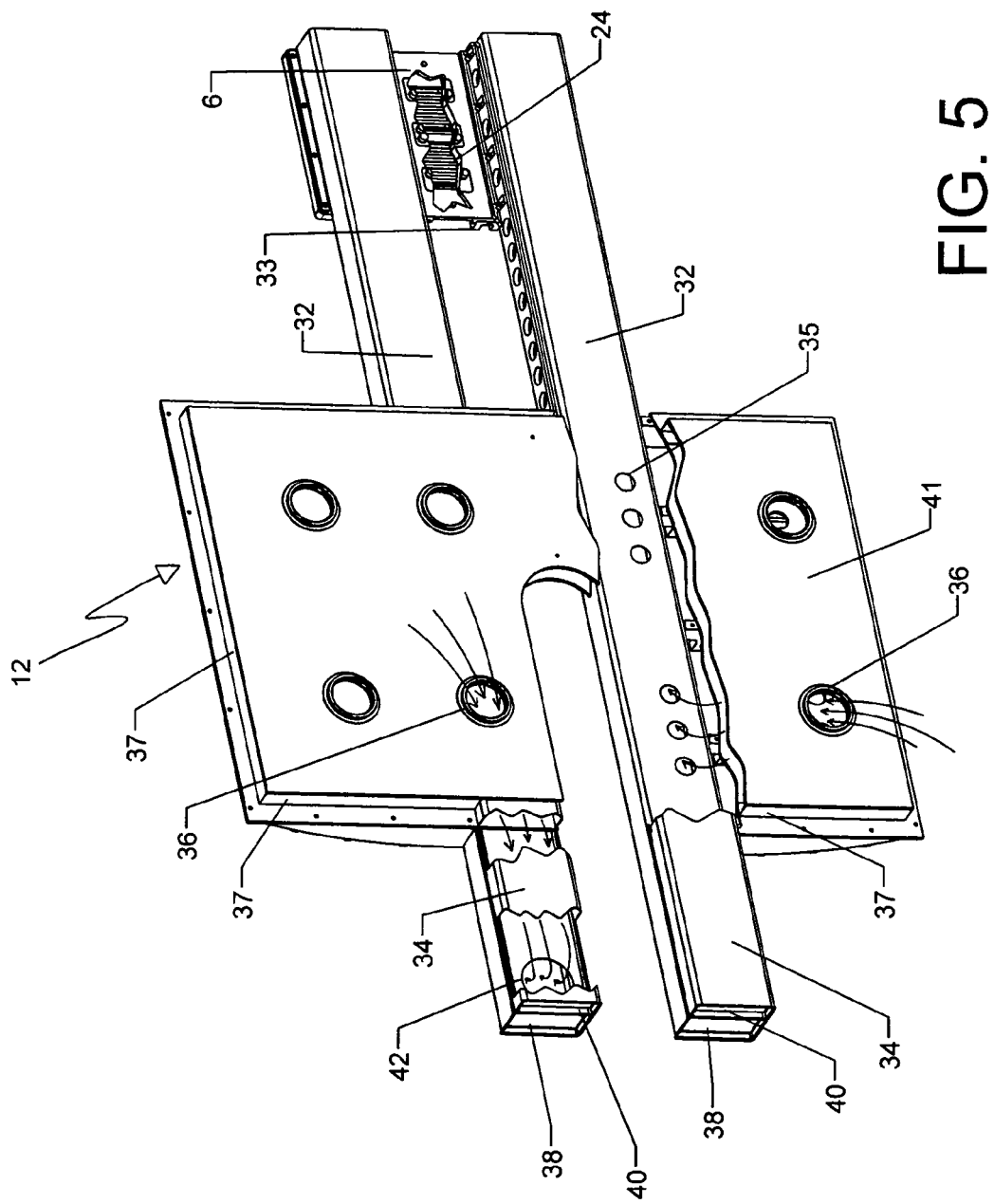
FIG. 5 is a pictorial diagram of a plenum assembly portion of the article retrieval system of FIGS. 1 and 2, illustrating vacuum air flow through a number of plenum openings and within primary and secondary plenum vacuum tubes of the plenum carriage.

Referring now more specifically to FIG. 5, it will be seen that the components of plenum assembly 12 are a plenum carriage 6 and two primary plenum vacuum tubes 32 whose ends are capped by means of primary plenum vacuum tube end caps 38. The primary plenum vacuum tubes 32 are provided with a plurality of primary plenum vacuum tube openings 35 and a plurality of secondary plenum vacuum tube openings 42. A plurality of plenum carriage bearings 33 and a plenum carriage belt clamp 24 are fixedly attached on the inner face of plenum carriage 6 and serve to slidably attach plenum assembly 12 to the intermediate carriage rails 14 and to slave belt 10. A receiver mounting plate 41 having a plurality of vacuum openings 36 therein is fixedly attached to plenum supports 37 by means of a conventional adhesive, for example. Plenum supports 37 are similarly fixedly attached to the primary plenum vacuum tubes 32, the ends of which include an opening 42 that provides a further route for the flow of vacuum air. Two secondary plenum vacuum tubes 34 having secondary plenum vacuum tube end caps 40 provide a supplemental conduit for the flow of vacuum air. More specifically, during normal operation of the telescoping article retrieval system of the present invention, the intermediate carriage 4 travels longitudinally between two predetermined positions, referred to as the intermediate extend position and the intermediate retract position. As intermediate carriage 4 travels between these two positions, plenum assembly 12 will travel longitudinally between two resulting positions, referred to as the plenum extend position and the plenum retract position. By design, the plenum extend and intermediate retract positions are the same position and correspond to the positions of plenum assembly 12 and intermediate carriage 4 as illustrated in FIG. 1. The plenum extend position represents a position that is double the distance of the intermediate extend position from either the plenum retract position or the intermediate retract position. During the portion of a cycle when plenum assembly 12 is at the plenum extend position, vacuum air enters vacuum openings 36 and is routed through openings 33 in primary plenum vacuum tubes 32 into plenum vacuum tubes 32, into intermediate vacuum tube 30, into stationary vacuum tube 28 by way of support mount 5, and out of port 9 in mount pad 7, as illustrated by the vacuum flow arrows shown in the lower portion of FIG. 5. As article retrieval system 100 cycles from the plenum extend position to the plenum retract position, intermediate vacuum tubes 30 cover the openings 33 in primary plenum vacuum tubes 32. When plenum assembly 12 is fully retracted, vacuum air enters vacuum openings 36 and is routed into secondary plenum vacuum tubes 34, into openings 42 in primary plenum vacuum tubes 32, into intermediate vacuum tubes 30, into stationary vacuum tubes 28, through support mounts 5, and out of port 9 in mount pad 7, as illustrated by the vacuum flow arrows shown in the upper portion of FIG. 5.

A plurality of conventional receivers or other suitable capture devices may be attached to vacuum openings 36 in receiver mounting plate 41 in correspondence with the positions of molded articles, for example, as they are ejected from an external molding machine.

We claim:

1. A telescoping article retrieval system comprising:
    A fixedly-positioned, horizontal main beam comprising a structural tube, said structural tube having one or more support mounts for attaching said telescoping article retrieval system to an external support structure, said main beam further comprising a main beam belt clamp fixedly attached thereto;
    a horizontally-positioned intermediate carriage slidably attached to said main beam for longitudinal movement alongside said main beam, said intermediate carriage comprising a carriage plate;
    a driven pulley fixedly attached to an outer face of said structural tube at a proximal end thereof, said driven pulley being coupled to an external driver;
    an idler pulley slidably attached to said outer face of said structural tube at a distal end thereof;
    a master drive belt attached between said idler pulley and said driven pulley;
    one or more slave belt idler pulleys attached at opposite ends of said carriage plate;
    a slave belt positioned in tension over said slave belt idler pulleys, said slave belt being fixedly attached to said main beam belt clamp;
    a plenum assembly slidably attached to said intermediate carriage and to said slave belt, said plenum assembly comprising a plenum carriage, said plenum carriage comprising one or more primary plenum vacuum tubes for conveying vacuum air from an external vacuum source to a plurality of vacuum openings in said plenum carriage.

2. A telescoping article retrieval system as in claim 1, further comprising a secondary plenum vacuum tube fixedly attached to each of said one or more primary plenum vacuum tubes, each of said secondary plenum vacuum tubes having an opening therein cooperating with an interior cavity of an adjacent one of said one or more primary plenum vacuum tubes to provide a secondary conduit for the conveyance of vacuum air when said plenum assembly is in a fully retracted position.

3. A telescoping article retrieval system as in claim 1, wherein:
    said intermediate carriage further comprises one or more intermediate carriage rails fixedly attached longitudinally to an outer face of said carriage plate; and
    said plenum assembly is slidably attached to said one or more intermediate carriage rails.

4. A telescoping article retrieval system as in claim 1, further comprising:
    one or more main beam rails fixedly longitudinally attached to said outer face of said structural tube;
    a plurality of intermediate carriage bearings fixedly attached on an inner face of said carriage plate; and
    a master drive belt clamp fixedly attached to an outer face of said carriage plate; and wherein:
    said master drive belt is attached to said master drive belt clamp, said plurality of intermediate carriage bearings and said master drive belt clamp serving to slidably attach said intermediate carriage to said main beam rails.

* * * * *